(No Model.)

F. C. STECKER.
CHEESE PRESS.

No. 534,702. Patented Feb. 26, 1895.

Witnesses
E. M. Albee
Heman Miller

Inventor
Fred C. Stecker
By G. K. Albee
his Atty.

UNITED STATES PATENT OFFICE.

FRED C. STECKER, OF NEENAH, WISCONSIN.

CHEESE-PRESS.

SPECIFICATION forming part of Letters Patent No. 534,702, dated February 26, 1895.

Application filed September 10, 1894. Serial No. 522,584. (No model.)

*To all whom it may concern:*

Be it known that I, FRED C. STECKER, a citizen of the United States, residing at Neenah, in the county of Winnebago and State of Wisconsin, have invented a new and useful Improvement in Cheese-Presses, of which the following is a specification.

My invention relates to presses designed more particularly for pressing the make of cheese known as "brick cheese," but may be applied to the pressing of any make or form of cheese, and also to pressing other material, its forms and followers being changed to suit the particular form of package required of the material to be pressed, and the objects of my improvement are, first, to provide a press of greater capacity than the usual make of presses for the kind of cheese aforementioned; second, one that can be operated in an easy and rapid manner; third, one that is provided with means for producing a continual pressure upon the cheese beyond the limit at which a screw for producing pressure thereon may be adjusted. I attain these objects by the mechanism illustrated in the accompanying drawings, in which—

Figure 1:
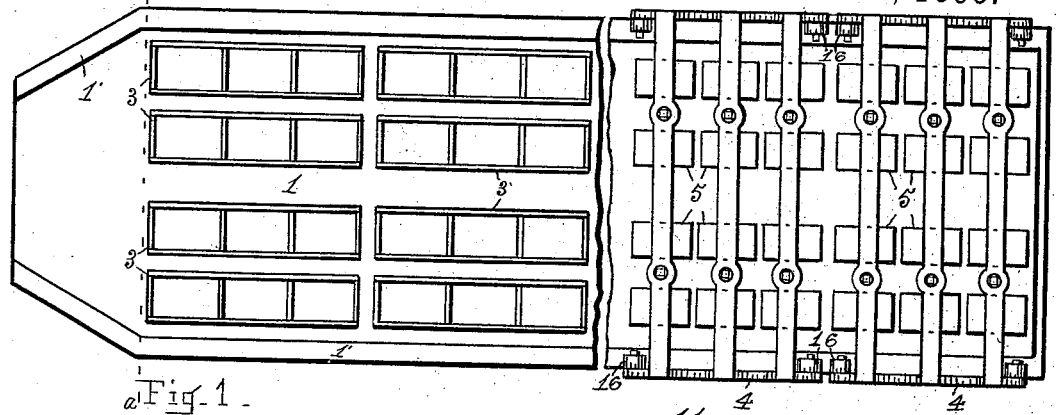
Figure 2:
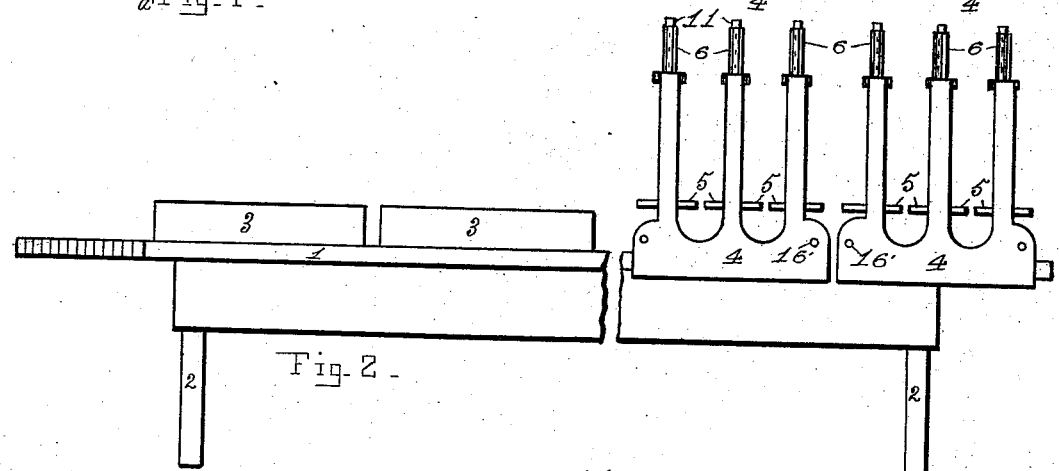
Figures 3, 4, 5:
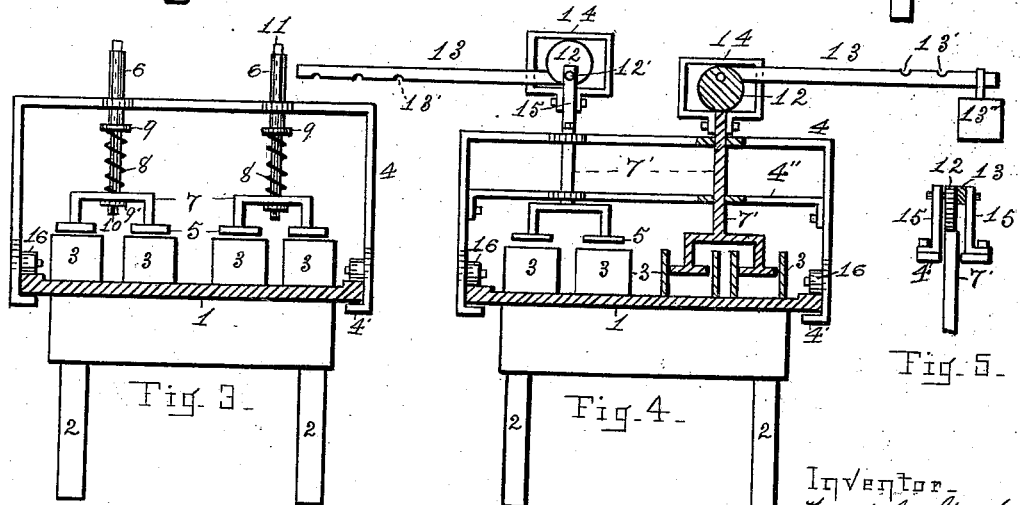

Figure 1 is a plan of a table top having the devices which compose the pressing mechanism arranged thereon. Fig. 2 is a side view of said table and pressing mechanism. Fig. 3 is an end view of the table and said mechanism in position thereon as it is seen in looking to the right of the line *a, a,* of Fig. 1, the table top being in section. Fig. 4 is an end view of the table like unto Fig. 3, and showing a modification of said mechanism, the cheese forms and followers at one side of the table being in section and the followers being at the limit of their lowest movement, and Fig. 5, is a view of the pressing device of said modification as it would appear in looking at it from the side of the table.

Similar figures of reference indicate like parts in the several views.

1 indicates the table top; 1', a rim arranged around the side edges and one end of the top; 2, table legs; 3, cheese forms; 4, movable frames arranged to be moved longitudinally of the table top; 5, cheese form followers; 6, screws arranged in the frames 4; 7, 7', angular yokes which connect two of the cheese form followers; 8, spiral springs upon the screws 6; 9, 9', collars which are fitted upon the screw shafts 6; 10, a pin for holding the collar 9', upon the screw shaft; 11, rectangular ends of the screw shafts; 12, eccentrics arranged above the frame 4 in the modification, (Fig. 4,) for producing a continuous downward pressure upon the cheese; 13, eccentric levers; 13', notches in said levers; 13", a weight upon said lever; 14, bands which inclose the eccentrics and by which the yokes and followers are raised and held above the cheese forms; 15, ears which are bolted to the upper cross bar of the frame 4 in Fig. 4, and in which the eccentrics are journaled upon the pin 12'; 16, friction rollers which are revoluble upon the pins 16', and which support the frame 4 upon the rim 1', or side edges of the table.

The table 1 may be of such a length as the capacity of the particular room, or factory may require, its width being preferably adapted to receive across it four sets of cheese forms, and its height suited for the easy manipulation of the several parts of the pressing apparatus, one end, (the right hand one in the present case,) being raised higher than the other for directing the whey as it is expressed from the curd toward the left hand end from whence it can be gathered into a suitable receptacle. The cheese forms 3 for this kind of cheese consist of only sides and ends, and may be of any number of individual cheese sections desired, or be as here shown, each form composed of three sections. Four forms being arranged side by side and in position to be operated upon by the six pressing devices which are arranged in one of the movable frames 4, one dozen cheese can by pressed in each of said frames at one time. These frames are provided at their lower ends with lips 4', for preventing the lifting of the frames during the operation of pressing the cheese, and also with friction rollers 16 for the easy movement of the frames along the table and over and away from the cheese forms.

One set of cheese forms, *i. e.*, forms for twelve cheese being filled and arranged near the left hand end of the table, the frame 4 which is nearest to them is moved over them, the several cheese forms being moved into their respective positions under the followers, whereby the followers can be pressed down within and into the individual cheese sections.

The number of followers and of the pressing devices for operating the same in each of the frames 4, may be more or less than are here shown, and the number of said frames and their corresponding cheese forms may be increased or diminished from the number here shown, as the requirements of any particular factory may demand.

The frames 4 are preferably of metallic construction. They consist of a pair of side pieces having the lip 4', and rollers 16, and are fitted to move easily along the table, the side pieces being connected to each other by bars which reach across the table and carry the pressing mechanism.

In Figs. 1, 2 and 3, the pressing mechanism consists of screws 6 which are threaded on their upper portions and are rectangular at their extreme upper ends for receiving a wrench for turning them. Their lower portions are without threads and are fitted to the angular yoke 7 which carries the followers 5.

A spring, 8, is arranged around the lower portion of the screw shaft and when placed in position should be somewhat compressed between the yoke 7 and collar 9 of the screw shaft. In screwing the follower down upon a cheese and into one of the individual cheese sections this spring is still more compressed, whereby, a continual pressure is exerted upon the cheese beyond the pressure due to the direct action of the screw. This feature makes the press more elastic in its operation and extends said pressure over a greater length of time, requiring thereby the attention of the pressman less often than without said springs.

In the modification, (Figs. 4 and 5,) an eccentric 12, having a lever 13 with a weight 13", adjustable thereon, is employed instead of a screw for forcing the followers into the individual cheese sections. The two followers at the left in Fig. 4, are shown as being at their greatest upward movement and the two at the right as at their greatest downward movement.

The eccentric and lever being in the position as at the right with the weight 13" upon said lever, a continual pressure will be given to the cheese as in the case of the screw 6 in connection with the spring 8.

The cheese being pressed sufficiently, the turning backward of the several screws in any one of the frames, or removing the weight 13" and throwing the levers over, will raise the followers thereof, when said frame can be moved to the right from over the cheese forms. The forms then being replaced by others containing unpressed curd and the frame returned to its position over said forms, the pressing can be continued as before described.

Having described my invention, what I claim, and desire to secure by Letters Patent, is—

1. A cheese press, consisting of a table having a plain cheese working surface of rectangular form, its longer sides having ways which serve as walls for directing the cheese whey toward one of its shorter sides, a plurality of removable cheese forms arranged upon said table, a frame arranged for movement upon the ways aforesaid toward and from said cheese forms, said frame being provided with cheese form followers corresponding in number with the individual cheese sections of said cheese forms, and independent mechanism for pressing said followers into said sections and upon the cheese therein, substantially as described.

2. A cheese press, consisting of a table having a plain cheese working surface of rectangular form, its longer sides having ways which serve as walls for directing the cheese whey toward one of its shorter sides, a plurality of removable cheese forms arranged upon said table, a frame arranged for movement upon the ways aforesaid toward and from said cheese forms, said frame being provided with cheese form followers corresponding in number with the individual cheese sections of said cheese forms, and independent mechanism for pressing said followers into said sections and upon the cheese therein, and also, with means for continuing said pressure beyond the limit of the pressure produced by the primary pressing mechanism thereof, substantially as set forth.

3. A cheese press, consisting of a table having a plain cheese working surface, a plurality of removable cheese forms arranged thereon, a frame arranged to be moved longitudinally of said table toward and from said cheese forms, said frame being provided with cheese form followers corresponding in number with the individual cheese sections of said cheese forms, and with screw shafts for pressing said followers into the individual cheese sections, said shafts each having a spring arranged between said followers and frame, the shafts being adapted to force said followers into the individual cheese sections and to press the cheese therein, and the springs to continue said pressure upon the cheese beyond the limit of the pressure produced by said screws, substantially as described.

FRED C. STECKER.

Witnesses:
H. J. GERHARDT,
MERRITT L. CAMPBELL.